(12) United States Patent
Cazier

(10) Patent No.: US 7,312,827 B2
(45) Date of Patent: Dec. 25, 2007

(54) GRAPHICAL DISPLAYS

(75) Inventor: Robert Paul Cazier, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 807 days.

(21) Appl. No.: 10/385,772

(22) Filed: Mar. 11, 2003

(65) Prior Publication Data

US 2004/0179123 A1 Sep. 16, 2004

(51) Int. Cl.
*H04N 5/222* (2006.01)
(52) U.S. Cl. .............................................. 348/333.02
(58) Field of Classification Search ........... 348/333.01, 348/333.02
See application file for complete search history.

(56) References Cited

U.S. PATENT DOCUMENTS

| | | | |
|---|---|---|---|
| 5,903,309 A | 5/1999 | Anderson | |
| 6,118,480 A | 9/2000 | Anderson | |
| 6,118,653 A * | 9/2000 | Kim | 361/683 |
| 6,784,925 B1 * | 8/2004 | Tomat et al. | 348/207.11 |
| 6,930,717 B1 * | 8/2005 | Kobayashi et al. | 348/333.02 |
| 6,977,680 B1 * | 12/2005 | Ichihara | 348/231.99 |
| 2002/0030754 A1 * | 3/2002 | Sugimoto | 348/333.02 |

* cited by examiner

*Primary Examiner*—Ngoc-Yen Vu
*Assistant Examiner*—Adam L Henderson

(57) ABSTRACT

A display for an image-capturing device having an image-display region and a menu-display region is provided. The menu-display region has a plurality of graphical icons, each having a tab. Tabs of successively adjacent graphical icons are offset with respect to each other. The tab may include an indicator that is displayed when the corresponding graphical icon is selected or highlighted.

18 Claims, 3 Drawing Sheets

GRAPHICAL DISPLAYS

BACKGROUND

Digital appliances, such as digital image-capturing devices, e.g., digital cameras, usually have a graphical user interface that includes a display, such as a liquid-crystal display or the like. Many displays include an image-display region for displaying a captured image and a menu-display region for displaying items of a menu, e.g., for manipulating or processing the displayed image. Menu items are typically in the form of graphical icons. Each graphical icon is usually representative of a task to be performed on the displayed image when selected. For example, a printer icon may cause the displayed image to be printed when selected.

Menu items are typically added to the menu by connecting the camera to a computer and downloading the menu items onto the camera from the computer. For example, a menu item for printing the displayed image, for printing multiple copies of the displayed image, for emailing the displayed image to an email address, etc. may be added to the menu. This can result in a large number of menu items, and many conventional displays cannot display all of the menu items at once. For example, some conventional displays have a scrolling list of menu items that displays only a portion of the menu items at a time. To view more items, a user has to scroll to another portion of the items.

SUMMARY

One embodiment of the present invention provides a display for an image-capturing device with an image-display region and a menu-display region. The menu-display region has a plurality of graphical icons, each having a tab. Tabs of successively adjacent graphical icons are offset with respect to each other. For another embodiment, the tab includes an indicator that is displayed when the corresponding graphical icon is selected or highlighted.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Figure 1:
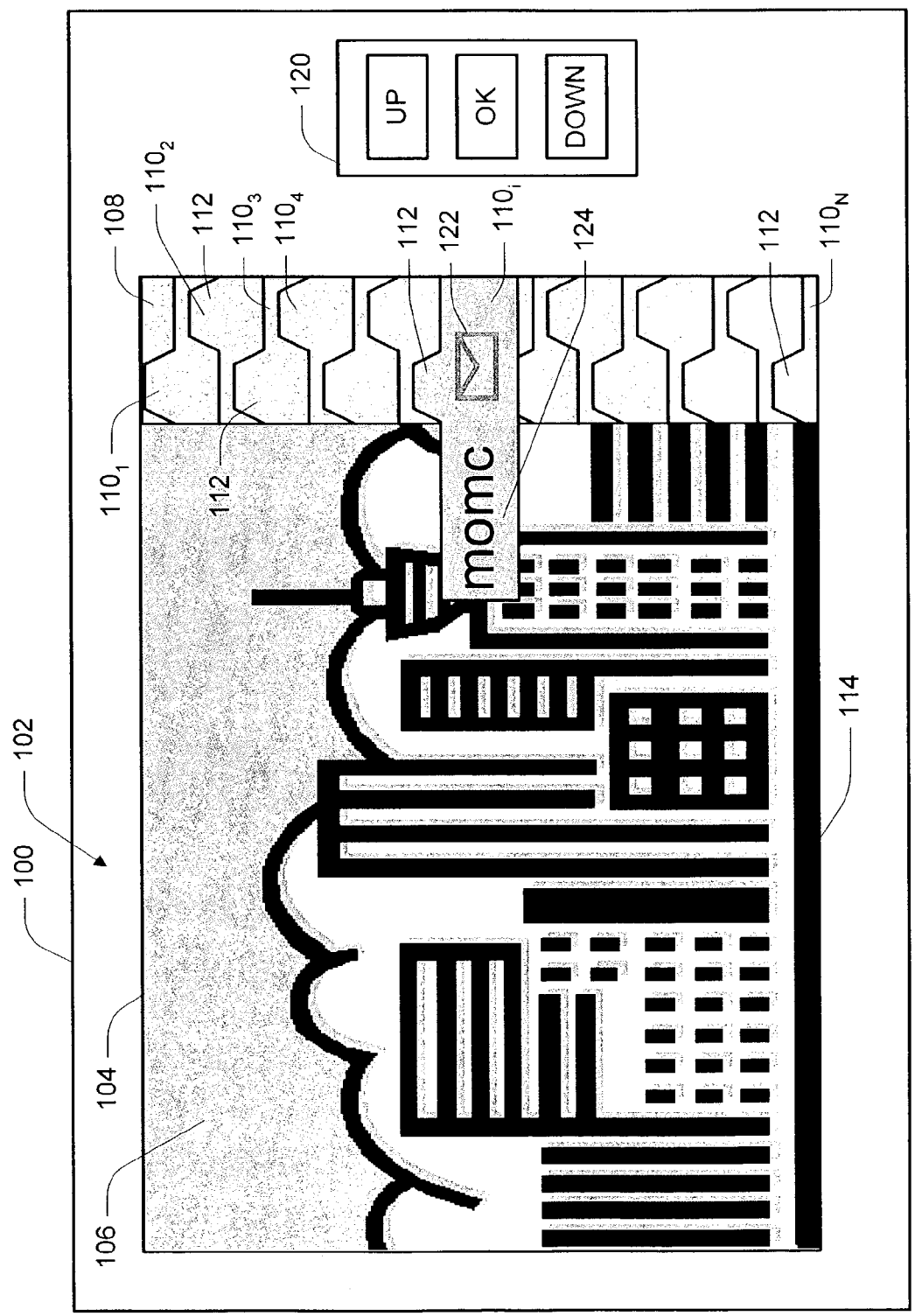
FIG. 1 is a block diagram illustrating an image-capturing device according to an embodiment of the present invention.
Figure 3:
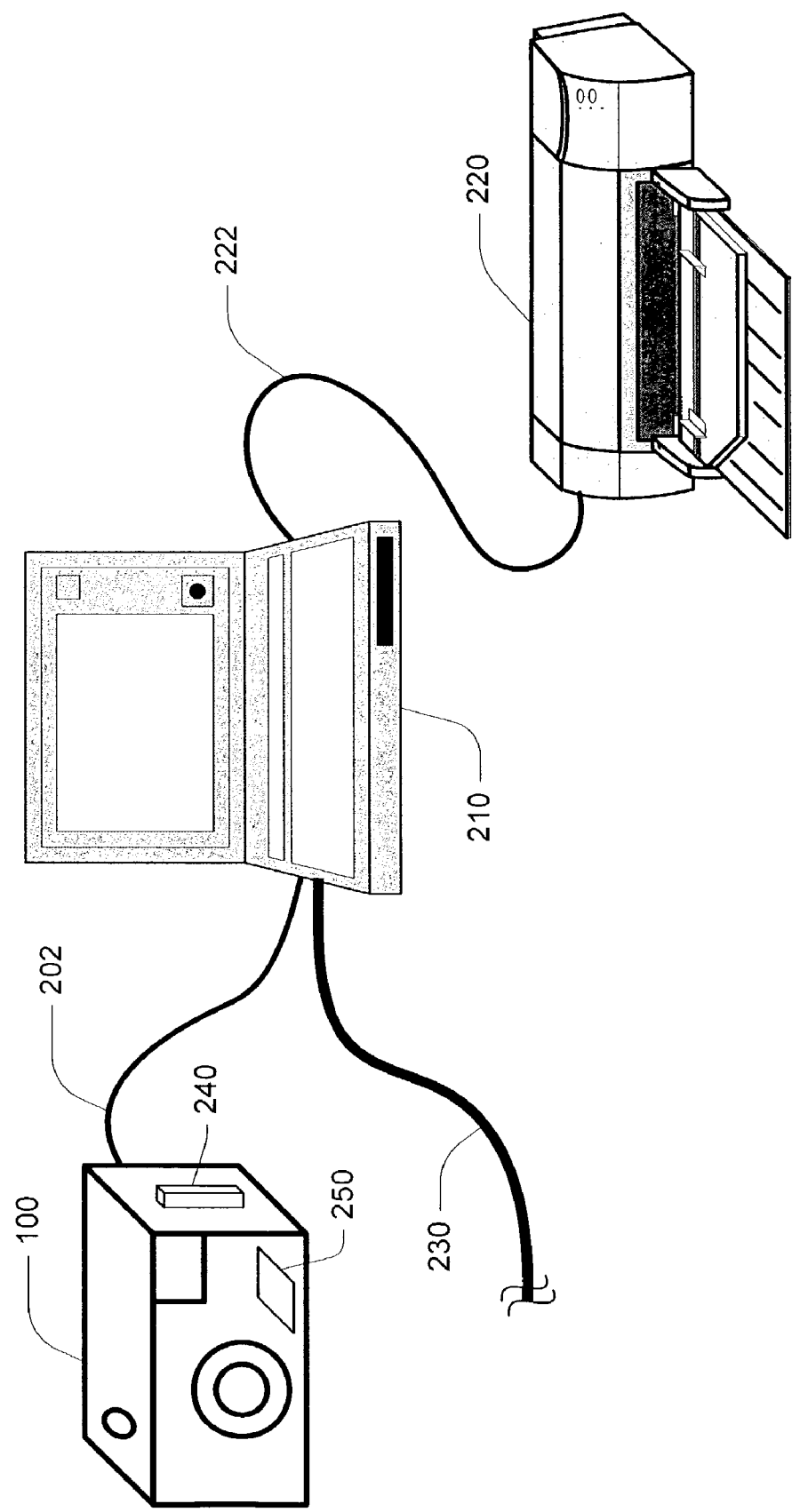
FIG. 3 illustrates a computer with an image-capturing device and a printer attached thereto.

FIG. 1 is a block diagram illustrating an image-capturing device 100, such as a digital camera, according to an embodiment of the present invention. Image-capturing device 100 includes a graphical user interface (GUI) 102 having a display 104, e.g. a liquid-crystal display or the like. Display 104 includes an image-display region 106 for displaying a captured image and a menu-display region 108 for displaying graphical icons $101_1$ to $110_N$. Each of graphical icons $110_1$ to $110_N$ corresponds to a different menu item that when selected causes an action to be performed on the displayed image, e.g., without user intervention upon connecting image-capturing device 100, as by cable 202 or wirelessly, to a computer 210 or the like, as shown in FIG. 3. For one embodiment, selecting a graphical icon 110 can cause a picture corresponding to the image or multiple copies of the picture to be printed by a printer 220 connected to computer 210 by a cable 222, as shown in FIG. 3. For another embodiment, selecting a graphical icon 110 can cause the image to be emailed to an email address associated with the selected item, the image to be sent to a website associated with the selected item, etc. when image-capturing device 100 is coupled to a host device, such as computer 210 connected to a data network, e.g., the Internet, a local area network, or the like, by a cable 230, etc.

In one embodiment, each of graphical icons $110_1$ to $110_N$ has the shape of an index card. In another embodiment, each of graphical icons $110_1$ to $110_N$ includes a tab 112. In various embodiments, the tabs 112 of successively adjacent graphical icons $110_1$ to $110_N$, e.g., $110_1$ and $110_2$, $110_2$ and $110_3$, etc., are offset with respect to each other. For one embodiment, this enables all of the menu items that can be loaded on to image-capturing device 100 to be viewed at once, e.g., without scrolling. Although FIG. 1 illustrates graphical icons $110_1$ to $110_N$ disposed vertically one above the other, the present invention is not limited to this. Instead, for some embodiments, graphical icons $110_1$ to $110_N$ are disposed horizontally, e.g., along a bottom 114 of display 104 (not shown).

To select one or more of graphical icons $110_1$ to $110_N$, a user individually highlights the one or more of graphical icons $110_1$ to $110_N$ by moving through graphical icons $110_1$ to $110_N$ using a selector 120. In one embodiment, selector 120 is a two- or four-way rocker. For embodiments where graphical icons $101_1$ to $110_N$ are vertically disposed, the user moves up or down through graphical icons $110_1$ to $110_N$, e.g., by selecting up or down (shown in FIG. 1) from selector 120. Alternatively, for embodiments where graphical icons $110_1$ to $110_N$ are horizontally disposed, the user moves sideways through graphical icons $110_1$ to $110_N$.

Figure 2:
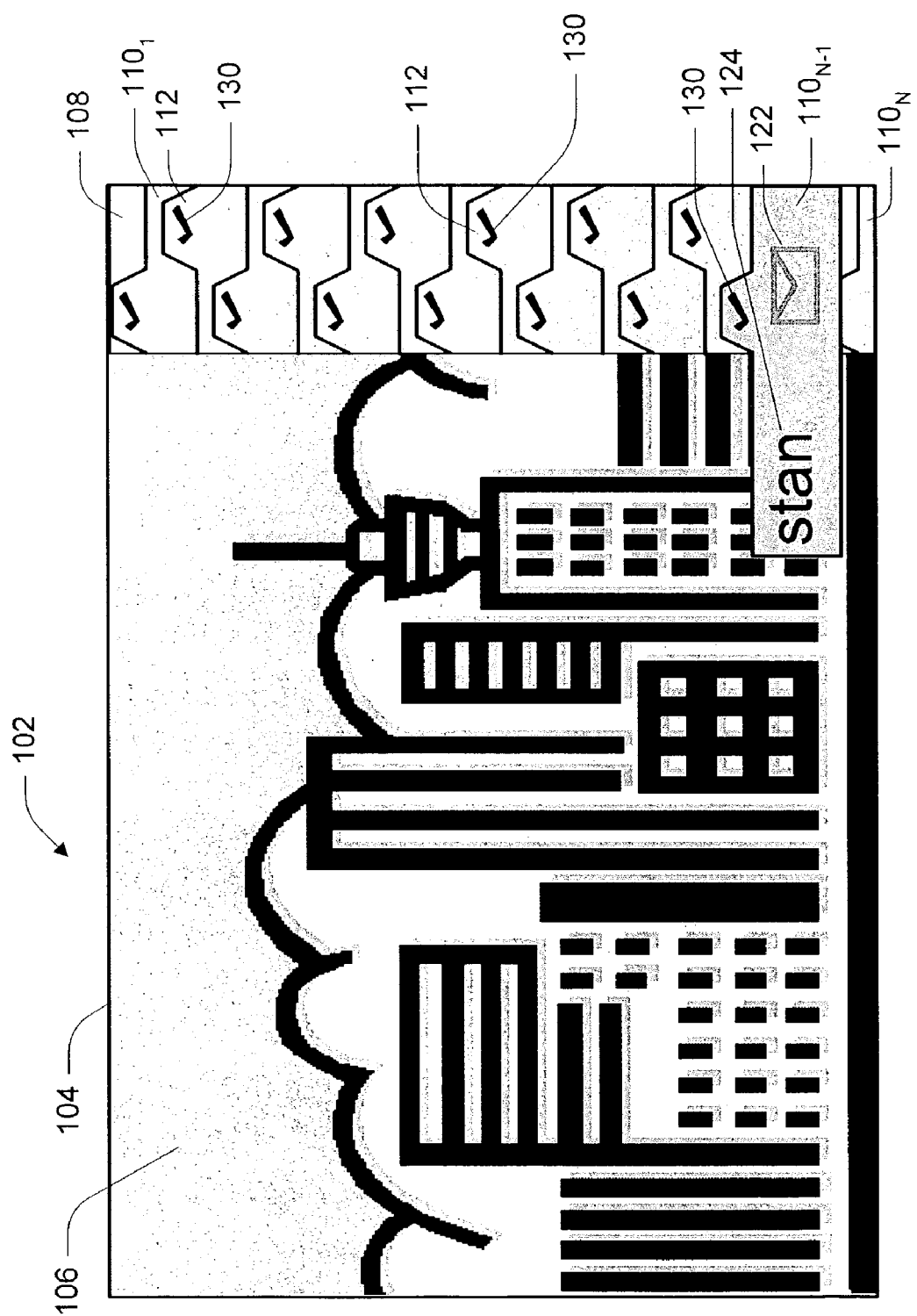
FIG. 2 illustrates a graphical user interface of the image-capturing device of FIG. 1 according to another embodiment of the present invention.

For one embodiment, a graphical icon 110 pops out (or is enlarged) when highlighted, as illustrated for graphical icon $110_i$ in FIG. 1 and graphical icon $110_{N-1}$ in FIG. 2. For another embodiment, when a graphical icon 110 pops out, an indicium 122 is displayed on a graphical icon 110. Indicium 122 is indicative of a particular action to be performed on the displayed image when the corresponding menu item is selected. For example, indicium 122 can be an envelope, as illustrated for graphical icon $110_i$ in FIG. 1 and graphical icon $110_{N-1}$ in FIG. 2, for indicating that the displayed image will be emailed when the corresponding menu item is selected. Indicium 122 can be a printer (not shown) for indicating that the displayed image will be printed when the corresponding menu item is selected, etc. Further indicia may be used to indicate other tasks or actions.

For other embodiments, text 124 is displayed on a graphical icon 110 when the graphical icon 110 pops out, as illustrated for graphical icon $110_i$ in FIG. 1 and graphical icon $110_{N-1}$ in FIG. 2. For example, for some embodiments, when text 124 is displayed adjacent an indicium 122 for indicating that the displayed image will be emailed, as illustrated for graphical icon $110_i$ in FIG. 1 and graphical icon $110_{N-1}$ in FIG. 2, the text represents an entity to which the email will be sent, e.g., "momc" in FIG. 1, "stan" in FIG. 2. For various embodiments, text 124 or indicium 122 is displayed individually on a graphical icon 110 when the graphical icon 110 pops out. For these embodiments, the text 124 or indicium 122 is indicative of a particular action to be performed on the displayed image.

After highlighting a graphical icon 110, it can be selected, e.g., using OK on selector 120. For one embodiment, selecting a graphical icon 110 causes an indicator 130, such as a check mark, an "X", etc. to be displayed on tab 112 of the selected graphical icon 110, as illustrated for graphical icon $110_{N-1}$ in FIG. 2. Moving from the highlighted graphical icon 110 to another graphical icon 110 causes the highlighted graphical icon 110 to become reduced in size so that only tab 112 with an indicator 130 displayed thereon is displayed, as illustrated for the other graphical icons 110 in FIG. 2. This enables a user to observe all of the selected graphical icons 110 (or menu items) at once, e.g., without scrolling. To deselect a graphical icon 110, a graphical icon 110 with an indicator 130 displayed on its tab 112 is highlighted and is deselected, e.g., using OK on selector 120. This removes indicator 130 from tab 112.

For one embodiment, selecting a graphical icon 110 stores an instruction in either a removable storage media 240, such as flash memory cards, compact discs, etc., removably connected to image-capturing device 100 or a permanent storage media 250 of image-capturing device 100, such as electrically-erasable programmable ROM (EEPROM or flash memory). For one embodiment, the instruction includes an identifier corresponding to the image associated with the selected graphical icon 110 and an action to be performed on the image, such as described above. Upon connecting image-capturing device 100 to computer 210, the instruction is transferred to computer 210 from image-capturing device 100. The instruction instructs computer 210 to perform the action associated with the selected graphical icon 110 on the image, such as emailing the image to an email address, sending the image to a website, actuating printer 220 to print a picture corresponding to the image, etc.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention It is manifestly intended that this invention be limited only by the following claims and equivalents thereof.

What is claimed is:

1. A display for an image-capturing device, comprising:
an image-display region configured to display images captured by the image-capturing device; and
a menu-display region comprising a plurality of first graphical icons and a second graphical icon interposed between successive first graphical icons, each of the first graphical icons and the second graphical icon having a tab, wherein the tabs of the first graphical icons are aligned with each other and the tab of the second graphical icon is out of alignment with the tabs of the first graphical icons;
wherein the image-display region and the first graphical icons and the second graphical icon of the menu-display region appear concurrently on the display;
wherein the image-display region and menu-display region appear on the image-capturing device;
wherein each of the first graphical icons and the second graphical icon interposed between successive first graphical icons is enlarged when highlighted.

2. The display of claim 1, wherein each of the first graphical icons and the second graphical icon interposed between successive first graphical icons has the shape of an index card.

3. The display of claim 1, wherein one or more of the first graphical icons and the second graphical icon interposed between successive first graphical icons comprises an indicium that is displayed when the one or more of the first graphical icons and the second graphical icon interposed between successive first graphical icons is highlighted.

4. The display of claim 3, wherein the indicium is indicative of an action to be performed on an image displayed on the image-display region.

5. The display of claim 1, wherein one or more of the first graphical icons and the second graphical icon interposed between successive first graphical icons comprises text that is displayed when the one or more of the first graphical icons and the second graphical icon interposed between successive first graphical icons is highlighted.

6. The display of claim 5, wherein the text is indicative of an action to be performed on an image displayed on the image-display region.

7. The display of claim 5, wherein the text is indicative of an entity to which an image displayed on the image-display region will be sent.

8. The display of claim 1, wherein one or more of the first graphical icons and the second graphical icon interposed between successive first graphical icons comprises an indicium and text that are displayed when the one or more of the first graphical icons and the second graphical icon interposed between successive first graphical icons is highlighted.

9. A display for an image-capturing device, comprising:
an image-display region configured to display images captured by the image-capturing device; and
a menu-display region comprising a plurality of first graphical icons and a second graphical icon interposed between successive first graphical icons, each of the first graphical icons and the second graphical icon having a tab, wherein the tabs of the first graphical icons are aligned with each other and the tab of the second graphical icon is out of alignment with the tabs of the first graphical icons;
wherein the image-display region and the first graphical icons and the second graphical icon of the menu-display region appear concurrently on the display;
wherein the image-display region and menu-display region appear on the image-capturing device;
wherein one or more of the first graphical icons and the second graphical icon interposed between successive first graphical icons comprises an indicium that is displayed when the one or more of the first graphical icons and the second graphical icon interposed between successive first graphical icons is highlighted; and
wherein the indicium is indicative of an action to be performed on an image displayed on the image-display region.

10. An image-capturing device, comprising:
a graphical user interface comprising a plurality of first graphical icons and a second graphical icon interposed between successive first graphical icons, each of the first graphical icons and the second graphical icon having a tab, wherein the tabs of the first graphical icons are aligned with each other and the tab of the second graphical icon is out of alignment with the tabs of the first graphical icons, wherein each tab includes an indicator that is displayed when the corresponding graphical icon is selected;
a selector for selecting the tab;
wherein the graphical user interface further comprises an image-display region configured to display an image captured by the image-capturing device; and
wherein the image-display region and the first graphical icons and the second graphical icon appear concurrently on the graphical user interface;
wherein the image-display region and the first graphical icons and the second graphical icon appear on the image-capturing device;
wherein each of the first graphical icons and the second graphical icon interposed between successive first graphical icons is enlarged when highlighted.

11. The image-capturing device of claim 10, wherein one or more of the first graphical icons and the second graphical icon interposed between successive first graphical icons comprises an indicium that is displayed when the one or more of the first graphical icons and the second graphical icon interposed between successive first graphical icons is highlighted.

12. The image-capturing device of claim 10, wherein one or more of the first graphical icons and the second graphical icon interposed between successive first graphical icons comprises text that is displayed when the one or more of the first graphical icons and the second graphical icon interposed between successive first graphical icons is highlighted.

13. A method of operating an image-capturing device, the method comprising:
concurrently displaying an image-display region configured to display images captured by the image-capturing device and a plurality of first graphical icons and a second graphical icon interposed between successive first graphical icons of a menu-display region on a graphical user interface of the image-capturing device;
highlighting a graphical icon of the first graphical icons and the second graphical icon interposed between successive first graphical icons, each of the first graphical icons and the second graphical icon having a tab, wherein the tabs of the first graphical icons are aligned with each other and the tab of the second graphical icon is out of alignment with the tabs of the first graphical icons; and
displaying an indicator on the tab of the highlighted graphical icon to indicate that the highlighted graphical icon is selected;
wherein the image-display region and the first graphical icons and the second graphical icon appear on the image-capturing device; and
wherein highlighting the graphical icon of the first graphical icons and the second graphical icon interposed between successive first graphical icons comprises enlarging that graphical icon.

14. The method of claim 13, wherein enlarging the graphical icon of the first graphical icons and the second graphical icon interposed between successive first graphical icons comprises displaying an indicium of that graphical icon.

15. The method of claim 14, wherein enlarging the graphical icon of the first graphical icons and the second graphical icon interposed between successive first graphical icons further comprises displaying text of that graphical icon.

16. The method of claim 15, further comprising reducing the size of the enlarged graphical icon so that only the tab of that graphical icon with the indicator displayed thereon is displayed.

17. The method of claim 16, wherein reducing the size of the enlarged graphical icon further comprises moving to another graphical icon of the first graphical icons and the second graphical icon interposed between successive first graphical icons from the graphical icon whose size was reduced.

18. A method of printing a picture corresponding to an image on an image-display region of an image-capturing device, the method comprising:
highlighting a graphical icon from a plurality of first graphical icons and a second graphical icon interposed between successive first graphical icons on a menu-display region of the image-capturing device, each of the first graphical icons and the second graphical icon having a tab portion, wherein the tab portions of the first graphical icons are aligned with each other and the tab portion of the second graphical icon is out of alignment with the tab portions of the first graphical icons;
selecting the highlighted graphical icon;
displaying an indicator on the tab portion of the selected highlighted graphical icon in response to the selection of that graphical icon; and
actuating a printer to print the picture in response to an instruction stored at the image-capturing device in response to the selection of the highlighted graphical icon, wherein the instruction is transferred to a computer connected between the printer and the image-capturing device from the image-capturing device;
wherein the image on the image-display region that corresponds to the picture appears concurrently with the plurality of first graphical icons and the second graphical icon interposed between successive first graphical icons of the menu-display region;
wherein the image-display region and the menu-display region appear on the image-capturing device; and
wherein highlighting the graphical icon of the first graphical icons and the second graphical icon interposed between successive first graphical icons comprises enlarging that graphical icon.

* * * * *

UNITED STATES PATENT AND TRADEMARK OFFICE
CERTIFICATE OF CORRECTION

PATENT NO. : 7,312,827 B2 Page 1 of 1
APPLICATION NO. : 10/385772
DATED : December 25, 2007
INVENTOR(S) : Robert Paul Cazier It is certified that error appears in the above-identified patent and that said Letters Patent is hereby corrected as shown below:

In column 2, line 5, after "icons" delete "$101_1$" and insert -- $110_1$ --, therefor.

In column 2, line 41, after "icons" delete "$101_1$" and insert -- $110_1$ --, therefor.

Signed and Sealed this

Seventeenth Day of June, 2008

JON W. DUDAS
*Director of the United States Patent and Trademark Office*